United States Patent [19]

Southworth

[11] Patent Number: 5,013,279
[45] Date of Patent: May 7, 1991

[54] APPARATUS FOR ENCASING A PRODUCT IN A CURVED CASING

[75] Inventor: William E. Southworth, Plymouth, Wis.

[73] Assignee: Johnsonville Sausage, Inc., Sheboygan, Wis.

[21] Appl. No.: 502,534

[22] Filed: Mar. 30, 1990

[51] Int. Cl.⁵ ............................................. A22C 7/00
[52] U.S. Cl. .................................... 452/46; 452/47; 452/45; 452/30; 426/513
[58] Field of Search ................. 452/46, 47, 48, 51, 452/30, 32, 35, 37, 45; 426/513

[56] References Cited

U.S. PATENT DOCUMENTS

| | | | |
|---|---|---|---|
| 3,672,001 | 6/1972 | Greider | 452/46 |
| 3,694,853 | 10/1972 | Greider | 452/46 |
| 3,835,503 | 9/1974 | Townsend et al. | 452/46 |
| 3,868,747 | 3/1975 | Townsend et al. | 452/46 |
| 3,873,744 | 3/1975 | Townsend et al. | 452/46 |
| 3,885,053 | 5/1975 | Townsend | 452/46 |
| 3,922,364 | 11/1975 | Townsend | 452/46 |
| 3,952,370 | 4/1976 | Greider | 452/46 |
| 3,964,128 | 6/1976 | Townsend et al. | 452/46 |
| 3,964,129 | 6/1976 | Townsend | 452/46 |
| 3,964,236 | 6/1976 | Smith | 452/46 |
| 3,971,101 | 7/1976 | Townsend et al. | 452/46 |
| 4,187,583 | 2/1980 | Townsend et al. | 452/46 |
| 4,570,301 | 2/1986 | Beckman et al. | 452/35 |
| 4,593,434 | 6/1986 | Townsend | 452/46 |
| 4,614,005 | 9/1986 | Townsend | 452/46 |
| 4,660,255 | 4/1987 | Townsend et al. | 452/46 |
| 4,670,942 | 6/1987 | Townsend | 452/46 |
| 4,694,536 | 9/1987 | Townsend | 452/46 |
| 4,812,322 | 3/1989 | Bielanski et al. | 452/47 |

Primary Examiner—Willis Little
Attorney, Agent, or Firm—Godfrey & Kahn

[57] ABSTRACT

An apparatus for encasing a product in a curved casing and the like and which includes an encasing machine having a stuffing tube including a discharge end which has a plurality of apertures, and wherein a product to be encased in pumped through the stuffing tube and exits the discharge end and moves generally normally relative to the longitudinal axis of the stuffing tube, and a selectively rotatable chuck assembly is borne by the encasing machine and includes a first end having a unitary wall which is substantially circular in shape, and a second end which is discontinuous, and wherein a curved collagen casing to be filled, upon exiting the chuck assembly, moves generally radially outwardly relative to the longitudinal axis of the chuck whereby the collagen casing is maintained in a proper attitude such that the casing is filled with the product to be encased, and wherein the stuffing tube is adapted to fold the product being encased against the wall of the collagen casing being filled such that the deleterious effects of smear is substantially reduced.

13 Claims, 4 Drawing Sheets

APPARATUS FOR ENCASING A PRODUCT IN A CURVED CASING

BACKGROUND OF THE INVENTION

1. Field of the Invention

The present invention relates to an apparatus for encasing a product in a curved casing, and more particularly to such an apparatus which is relatively inexpensive to construct and maintain, and which further may be successfully utilized in combination with prior art product encasing machines to produce a curved product having a commercially acceptable quality not possible heretofore by utilizing the same prior art devices.

2. Description of the Prior Art

Product encasing machines of various configurations, capacities and other operational characteristics have been known and utilized for many years. In their most common form, which is illustrated most clearly by reference to U.S. Pat. No. 3,672,001, the product encasing machine includes a base member which movably supports a feedhorn assembly which is disposed in fluid flow communication with a pump assembly and which pumps meat batter, under pressure, into the feedhorn assembly. Further, a casing feeding mechanism is mounted on the base and is adapted to advantageously position a supply of empty product casings in substantially coaxial alignment with the feedhorn assembly. A rotatable chuck assembly is positioned in a fixed, predetermined position on the base and is adapted to receive each of the casings to be filled, and which further is adapted to be rotated in substantially coordinated relation with the feedhorn assembly in order to produce linked casing products. The precise operation of a product encasing machine is set forth in significant detail in U.S. Pat. No. 3,672,001 and therefore for the sake of brevity is not repeated herein.

While it is well understood that the utilization of these prior art product encasing machines achieve numerous laudable results, the devices, however, suffer from a multiplicity of common drawbacks which have detracted from their usefulness. For example, nearly all of the prior art devices employ, in one form or another, a feedhorn assembly which is adapted to be positioned internally of the casing such that it can deliver meat batter which is pumped under pressure into the casing to be filled. While this arrangement usually works with some degree of success, the prior art devices have a common shortcoming in that they may under certain operational conditions create in the linked products an undesirable effect called "smear" which is caused by a breakdown of fat particles or fat cells in the meat batter. It has been determined that the breakdown of the fat particles or cells is caused by the excessive mechanical action of the meat pump acting upon the meat batter. Under assorted operational circumstances which include the type of meat batter employed, and the type of fat present, the mechanical action of forcing the meat batter into the feedhorn assembly can cause some types of soft fat to melt or the distortion of the size and shape of hard types of fat. Further, and if the mechanical action is severe, fat cells can be ruptured, thereby increasing their respective surface areas.

The presence of smear is not desirable inasmuch as the linked products, and more particularly the fat particles, do not acquire a desirable color as a result of going through the smoking process following the manufacture thereof. As a consequence, linked products having a noticeable amount of smear do not acquire a commercially attractive color.

Furthermore, the amount of smear may be increased by the effect of friction which results as a consequence of pumping the meat batter through the feedhorn assembly and into a dry product casing.

Still another significant problem associated with the prior art product encasing machines and their related subassemblies results from characteristics inherent in their individual designs. For example, many of the prior art devices such as that shown in U.S. Pat. No. 3,672,001 have difficulty producing encased products utilizing curved casings. More particularly, these encasing machines have problems completely filling the curved casings thereby substantially eliminating all the air spaces in the casings. It should be understood that air spaces in the casings may also cause the individual encased products to have a commercially undesirable color and appearance following the smoking process.

Therefore, it has long been known that it would be desirable to have an apparatus for encasing a product in a curved casing and which is adapted to enhance the performance of a product encasing machine or the like by producing a curved product as intended during the operation thereof, which is adapted to be constructed as an operable part of a product encasing machine during manufacture, or retrofitted on existing product encasing machines, and which further is adapted to produce an encased product having an acceptable amount of smear and substantially no air spaces such that the encased products have a commercially acceptable color following the smoking process.

OBJECTS AND SUMMARY OF THE INVENTION

Therefore, it is an object of the present invention to provide an improved apparatus for encasing a product in a curved casing.

Another object of the present invention is to provide such an apparatus which can be constructed as an integral part of a product encasing machine at the time of manufacture, or which can be manufactured in the manner of a retrofit for commercially available product encasing machines.

Another object of the present invention is to provide such an apparatus which is operable to produce encased products having an acceptable amount of smear and which further is operable to substantially eliminate air pockets in the encased products.

Another object of the present invention is to provide such an apparatus which is easily mounted on commercially available product encasing machines and which further is easily accessed for purposes of maintenance, modification and the like.

Another object of the present invention is to provide such an apparatus which includes a feed horn assembly having a plurality of apertures formed in its discharge end and wherein the product to be encased exiting through the apertures moves generally radially outwardly relative to the feed horn assembly and into the curved casing.

Another object of the present invention is to provide such an apparatus which includes a selectively rotatable chuck, and wherein an encased product exiting the chuck moves along a path generally radially outwardly relative to the chuck thereby maintaining the curved casing in an advantageous attitude relative to the chuck whereby the feed horn assembly may substantially fill the entire casing with the product to be encased.

Another object of the present invention is to provide such an apparatus which is characterized by ease of installation, simplicity of construction, and which further can be sold and maintained at a relatively nominal expense.

Another object of the present invention is to provide such an apparatus which is operable to obtain the individual benefits to be derived from related prior art devices while avoiding the detriments which are individually associated therewith.

Further objects and advantages are to provide improved elements and arrangements thereof in an apparatus for the purposes described which is dependable, economical, durable and fully effective in accomplishing its intended purposes.

These and other objects and advantages are achieved in the apparatus for encasing a product in a curved casing wherein, in the preferred embodiment, the apparatus includes a stuffing tube mounted on a product encasing machine and having a product receiving end and a discharge end and wherein the discharge end has a plurality of apertures, and a chuck is rotatably mounted on the product encasing machine and disposed in substantially coaxial alignment with the stuffing tube, and wherein the chuck has a wall defining a passageway, and wherein the wall has opposite first and second ends and the wall located at the first end is substantially circular shaped and the wall at the second end is substantially semicircular shaped, and wherein the chuck is adapted to receive the curved casing to be filled and wherein the casing upon being filled with the product exits the chuck at the second end thereof and moves generally radially outwardly relative to the chuck thereby maintaining the curved casing in an attitude whereby the curved casing can be substantially filled with the product to be encased.

DESCRIPTION OF THE PREFERRED EMBODIMENT

Figure 1:
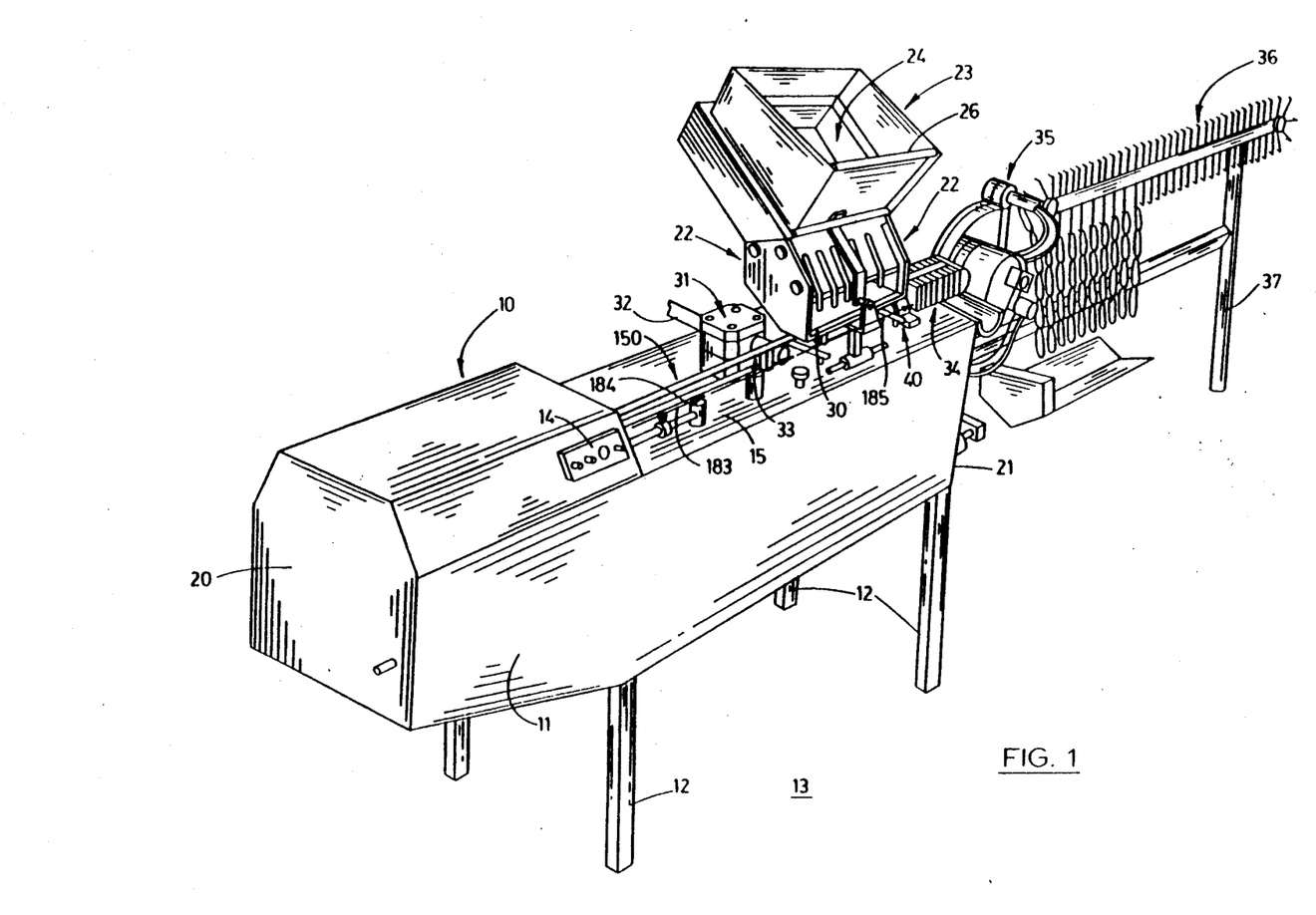
FIG. 1 perspective, side elevation view of a product encasing machine including the apparatus of the present invention shown in a typical operative configuration.

Referring more particularly to the drawings, the apparatus for encasing a product in a curved casing is made integral with a product encasing machine which is generally indicated by the numeral 10 in FIG. 1. As shown therein, the apparatus is mounted on a Townsend RT7 ® product encasing machine which is employed widely in the meat packing industry and which is described in detail in U.S. Pat. No. 3,672,001. The encasing machine 10 includes a base 11 which is supported by a plurality of legs 12 in spaced relation relative to a working surface 13. The base member also includes a control panel 14, and further defines a substantially horizontal upper supporting surface 15. The base member has opposite first and second ends 20 and 21, respectively. The first end houses an air cylinder (not shown) which is operable to move a feed horn assembly o stuffing tube along a predetermined path to travel. The operation of the air cylinder and the stuffing tube will be discussed in greater detail hereinafter.

Fixed on the supporting surface 15 and in a location adjacent to the second end 21, are a pair of spaced apart plates 22. The plates 22, which are disposed in a substantially normal attitude relative to the supporting surface, are individually mounted to a hopper 23 which defines a storage space 24, and which is adapted to receive a supply of curved collagen casings 25. The casings 25 are manufactured from collagen which is a connective tissue protein found in organ and by-products of meat. When collagen is heated, it breaks down to form a gelatin. The casings are edible and are not pealed off as in other encased products. The casings are very fragile and are easily torn in their fresh, usable state. The hopper 23 has an intake end 26 and an opposite discharge end 30 which is positioned in spaced relation relative to the supporting surface 15. As best illustrated by reference to FIG. 1, a meat mixture pump 31 of conventional construction is fixed on the supporting surface 15 and is located substantially intermediate the first and second ends of the base 11. The pump 31 is connected to a meat mixture supply (not shown) by a meat conduit 31. Further, the pump 31 has a passageway 33 formed therein which is adapted to receive the stuffing tube which will be discussed in the paragraphs which follow.

Positioned in a predetermined location on the supporting surface 15 and adjacent the second end 21 of the base 11 is a linking assembly 34. Further, a looping assembly 35 and associated take-away conveyor 36 are mounted in product receiving relation relative to the linking assembly to receive the completed linked product. The take-away conveyor is mounted on supporting legs 37. The above-identified assemblies and their operation are discussed in significant detail in U.S. Pat. No. 3,191,222 and therefore for the sake of brevity are not disclosed in further detail herein.

As best illustrated by reference to FIGS. 1 and 6, a twisting head assembly 40 is mounted on the upper supporting surface 15 of the base 11 and is positioned in adjacent spaced relation relative to the second end 11. The twisting head assembly includes a base member 41 which is secured by suitable fasteners to the supporting surface 15, and an upper gear housing 42 is made integral with the base and extends upwardly at a nearly normal attitude therefrom. The upper gear housing has an aperture 43 formed therein. The upper gear housing further receives a gasket and seal 44 and 45, respectively, which are adapted to mate with a gear assembly 50 which is rotatably mounted in the gear housing. The gear assembly includes a flange or base member 51 and a gear member 52 having a multiplicity of teeth 53 is surmounted thereon. The gear assembly also includes a substantially cylindrically shaped tube 54 which is made integral with the gear member 52 and which extends at a substantially normal attitude therethrough. The substantially cylindrically shaped tube has opposite inside and outside surfaces 55 and 60, respectively, and the inside surface 55 defines a passageway 61. An engagement pin or key 61 is mounted on the inside surface and extends substantially radially inwardly a predetermined distance. When rotatably mounted on the upper gear housing 42, a seal 63 engages the gear assembly 50.

A lower gear housing 70 is operative to mate with the upper gear housing 42. The lower gear housing is mounted below the supporting surface 15 of the base 11 and includes a pair of substantially coaxially aligned apertures 71. The apertures are adapted to rotatably receive a suitably dimensioned drive shaft 72. The drive shaft is rotatably mounted in the lower gear housing by a suitable bearing 73. A drive gear 74 having a multiplicity of teeth 75 is mounted on the drive shaft. A source of motive power (not shown) is connected to the drive shaft and a suitably dimensioned key 76 fixes the drive gear in a predetermined position on the drive shaft. When assembled, the drive gear 74 meshes with the gear assembly 50, thereby imparting movement to same when motive power is selectively applied to the driveshaft 72.

Figure 2:
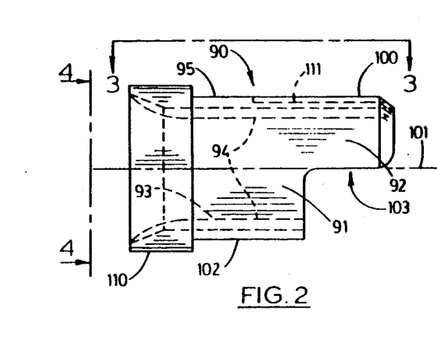
FIG. 2 is a fragmentary, side elevation view of a chuck assembly of the present invention shown in a typical operative configuration.
Figure 3:
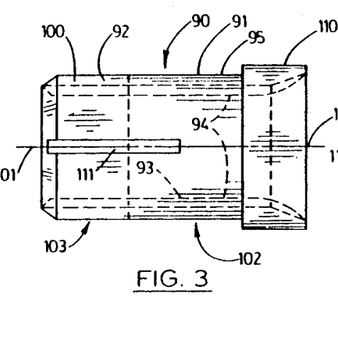
FIG. 3 is a fragmentary, plan view of the chuck assembly of the present invention shown in a typical operative configuration.
Figure 4:
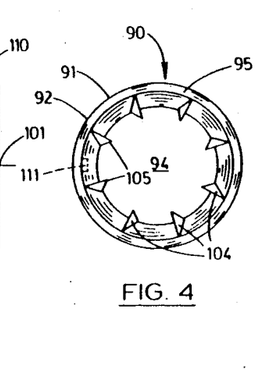
FIG. 4 is a fragmentary, rear elevation view of the chuck assembly of the present invention shown in a typical operative configuration.
Figure 5:
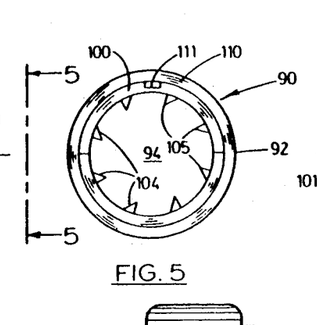
FIG. 5 is a fragmentary, front elevation view of the chuck assembly of the present invention shown in a typical operative configuration.
Figure 10:
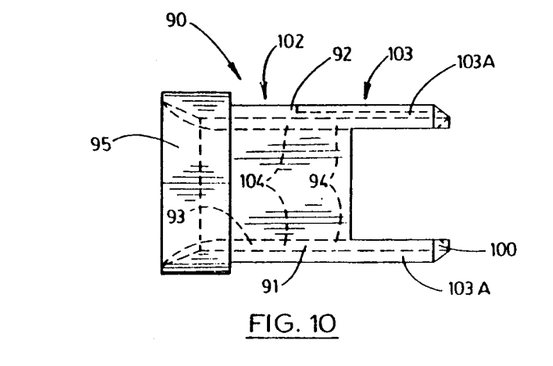
FIG. 10 is a fragmentary, perspective, side elevation view of a second embodiment of the chuck assembly of the present invention.

A chuck assembly which is generally indicated by the numeral 90 is releasably engaged by the twisting head assembly 40 in the manner which will be discussed in greater detail hereinafter. The chuck 90 includes a wall 91 having an outside surface 92 and an opposite, inside surface 93 which defines a substantially uniform passageway 94 of predetermined dimensions. The chuck 90 has a first end 95 and an opposite second end 100. Further, the chuck is operable to be selectively rotated about a substantially longitudinal axis which is indicated by the line labeled 101. The wall 91 includes a first portion 102 and an opposite second portion 103. As best illustrated by reference to FIG. 7, the first portion of the wall is disposed in close proximity to the first end thereof and is substantially continuous having a substantially circular shape and which is best illustrated by reference to FIG. 4. Further, the second portion 103 which is located at the second end 100, is substantially discontinuous, the second portion having a substantially semicircular shape. An alternative embodiment of the chuck assembly 90, and which is best seen by reference to FIG. 10, has a second portion 103 which includes a discontinuous wall having first and second discrete portions which are indicated by the numerals 103A and 103B respectively and which are substantially arcuately shaped. The first and second portions define a space 103C therebetween. The chuck 90 includes a plurality of product engaging ribs or vanes 104 which are mounted on the inside surface 93 and which are disposed in predetermined spaced relation one to the other and which are further positioned in a predetermined substantially helical pattern. Each of the product engaging ribs or vanes 104 includes an apex 105 which is operable to engage the individual collagen casings 25 which are urged through the passageway 94 in a fashion which will be discussed in greater detail hereinafter. As best illustrated by reference to FIG. 2 the chuck 90 includes an enlarged collar 110 which is integral with the outside surface 92 and which is positioned at the first end thereof. Further, and as best illustrated by reference to FIG. 3, a longitudinally disposed groove or keyway 111 is formed in the outside surface 92 of the wall 91 of the first portion 103A and is operable to slidably receive the engagement pin 62 which was earlier discussed. As best illustrated by reference to FIG. 7, the chuck is rotatably borne by the twisting head assembly 40 and more particularly the upper gear housing 42 and the twisting head assembly is operable to impart selective rotational movement to the chuck in such a fashion whereby the plurality of product engaging ribs are adapted to engage the individual collagen casings 25 and impart rotational movement to same whereby the individual collagen casings, as soon as they are individually filled with the meat product, exit the second end 100 and are permitted to move generally radially outwardly relative to the longitudinal axis. This pattern of movement maintains the curved casing in an attitude whereby it can be substantially filled with the meat product. This relationship is best illustrated by reference to FIG. 7.

Figures 8, 9:
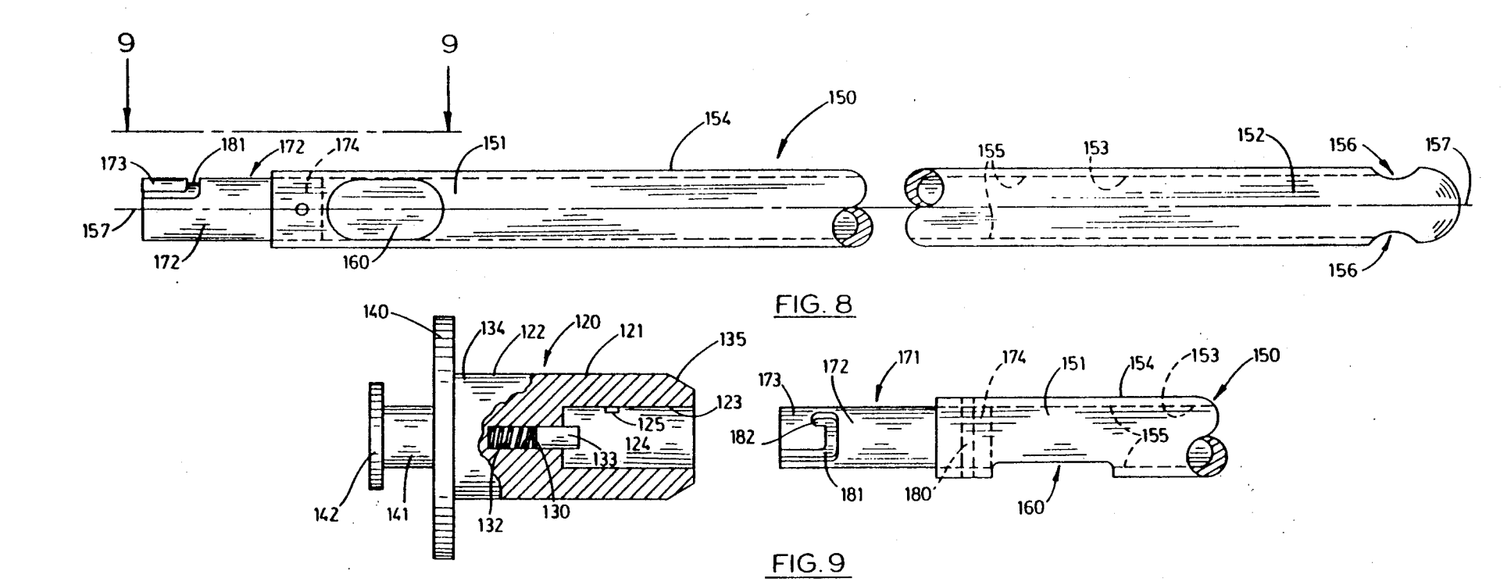
FIG. 8 is a fragmentary, side elevation view of a feed horn assembly of the present invention.
FIG. 9 is a fragmentary, longitudinal, vertical sectional view taken from a position along line 8—8 of FIG. 9.

As earlier discussed, the product encasing machine 10 includes an air cylinder (not shown) and which is adapted to urge a feed horn assembly or stuffing tube along a predetermined path of travel into operation with the chuck 90. The stuffing tube will be discussed in the paragraphs which follow. A connector mechanism 120 is borne by the air cylinder and is adapted to releasably mount the stuffing tube in a predetermined position thereon. The connector mechanism 120 includes a main body 121 which has a substantially cylindrical shape and which has an outside surface 122 and an opposite inside surface 123 which defines a first passageway 124. As best seen by reference to FIG. 9, an engagement pin or key 123 is mounted on the inside surface 123 and extends substantially radially inwardly a predetermined distance therefrom. In addition, the inside surface 123 defines a second passageway 130 which is disposed in substantially coaxial relation relative to the first passageway and which is adapted to receive a biasing spring 132 therein. The spring 132 is operable to act on a movable member or shaft 133 which is slidably received in the second passageway, thereby urging it outwardly towards the first passageway. The connector mechanism 120 further includes a flange member 140 which is disposed at the first end thereof and a substantially longitudinally disposed post 141 is connected to the first end and extends longitudinally outwardly therefrom. A plate 142 is fixed to the end of the post and is disposed substantially transversely relative thereto.

An elongated stuffing tube or feed horn assembly, and which is generally indicated by the numeral, 150 is connected to the air cylinder (not shown) by the connector assembly 120 and is adapted to selectively and reciprocally move along a predetermined path of travel into product discharging relation relative to the chuck 90. The operation, and movement of the stuffing tube along the aforementioned path of travel will be discussed in greater detail hereinafter. The stuffing tube 150 includes a first rearwardly disposed end 151 which operates as an intake: and opposite, second, or discharge end 152. The stuffing tube further includes an inside surface 153 and an outside surface 154. The inside surface 153 defines a meat passageway 155 which is operable to channel the meat batter which is pumped under pressure by the meat pump into the individual collagen casings 25. As best illustrated by reference to FIGS. 7 and 9, the discharge or second end includes a plurality of apertures which are individually positioned substantially normally relative to the longitudinal axis 157 of the stuffing tube. In addition to the foregoing, the first or intake end 151 has an elongated meat intake aperture 160 which receives the meat batter which is pumped from the meat pump 31.

The elongated stuffing tube 150 is releasably mounted on the connector mechanism 120 by a connector rod 171 which is fixed on the first end 151 of the stuffing tube 150. The connector rod 171 includes a substantially cylindrically shaped main body 172 which is appropriately dimensioned to be slidably received in the first passageway 124 of the connector mechanism 120. This is best seen by reference to FIG. 9. The main body 172 further includes a first end 173 and an opposite second end 174. A pin 180 fixedly secures the second end 174 in mating receipt with the first end 151 of the stuffing tube 150. In addition, the first end 173 has a substantially J-shaped passageway formed therein and which is adapted to slidably receive the engagement pin 125 which extends substantially radially inwardly relative to the inside surface 23. In operation, the stuffing tube 150 and, more particularly, the connector rod mounted thereon, is slidably received in the first passageway 124; and the J-shaped passageway is aligned in registry with the pin such that it is slidably received in same. Following this alignment, selective inward pressure and rotational movement is applied to the stuffing tube such that the pin may be urged to the termination point 182 of the J-shaped passageway. The spring 132, acting upon the movable shaft 133, is adapted to urge the elongated stuffing tube 150 outwardly, thereby firmly seating the engagement pin 125 at the termination point 182 of the J-shaped passageway. In this fashion, the stuffing tube is releasably connected to the connector mechanism.

As best illustrated by reference to FIGS. 1 and 7, the air cylinder (not shown) is operable to selectively and reciprocally move the stuffing tube 150 along a predetermined, substantially linear and horizontally disposed path of travel 183 from a first position 184 wherein the discharge end 152 of the stuffing 150 tube is disposed in predetermined spaced relation relative to the chuck 90, and a second position 185 wherein the discharge end is positioned in the passageway 94 which is defined by the inside surface 93 of the chuck. As best illustrated by reference to FIG. 7, and in the second position 185, the discharge end 152 is disposed in predetermined spaced radially inwardly disposed relation relative to the inside surface 93. In such a position it is operable to discharge the meat product pumped by the meat pump 31 into the individual collagen casings 25 in an advantageous fashion whereby smear is substantially reduced.

As earlier discussed, the term "smear" in the meat packing industry is generally defined as the breakdown of fat particles or fat cells and which is caused by the excessive mechanical manipulation of a meat batter product including same. Generally speaking, and depending upon the type of fat involved, the breakdown or disruption of fat cells may result in the melting of soft types of fat, or the distortion of the sizes and shapes of hard types of fat cells. Subject to the amount of mechanical manipulation applied, fat cells can on occasion rupture, thereby increasing their overall surface areas and thereby increasing the detectable smear. As earlier discussed, increased amounts of smear has a deleterious effect on the commercial acceptability of the linked products produced inasmuch as linked products having a large amount of smear will have a commercially undesirable color after the product has gone through the smoking process, that is, fat, in the form of smear, does not acquire a commercially acceptable color. It has long been known that the purchase of food products such as linked meat products by consumers is largely influenced by such characteristics as exterior coloration and size, and therefore, the control of smear is extremely important from an economic standpoint. As noted earlier, the effect of smear is caused by the pumping of the meat batter from the meat pump 31 through the meat passageway 155 which is disposed substantially longitudinally relative to the elongated stuffing tube 150. As the meat batter is pumped through the meat passageway, the friction of the meat batter along the inside surface 153 creates heat which breaks down or distorts the fat particles and fat cells in the meat batter. As the meat batter is discharged from the discharge end 152 of the stuffing tube 150, the relative positions of the individual apertures 156 is such that the exiting meat batter assumes a stuffing pattern whereby it is substantially folded against the casing 25 as opposed to being urged or forced along the casing, thereby filling the casing. This stuffing pattern reduces the friction against the casing wall and thereby has the overall effect of reducing the total amount of visually detectable smear with the result that the encased linked products achieve a commercially acceptable color following the smoking process.

OPERATION

The operation of the described embodiment of the present invention is believed to be readily apparent and is briefly summarized at this point.

Figure 6:
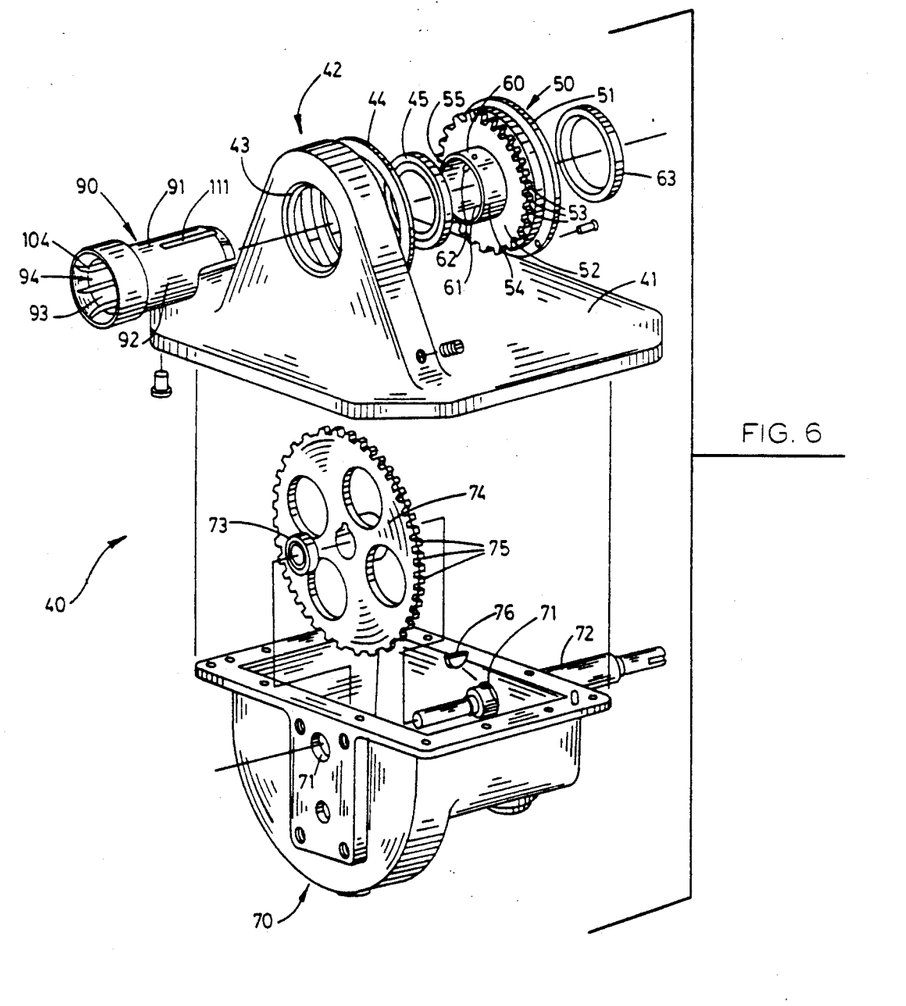
FIG. 6 is a fragmentary, perspective, exploded, side elevation view of the apparatus of the present invention and showing the chuck assembly thereof.
Figure 7:
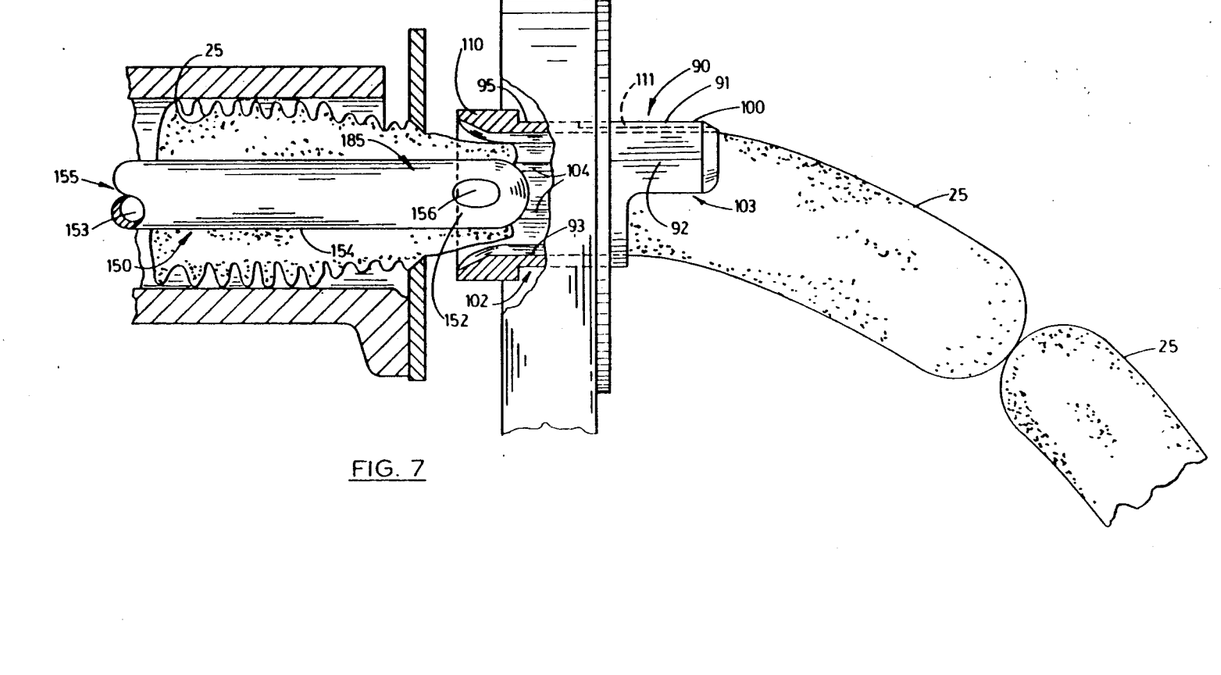
FIG. 7 is a fragmentary, longitudinal, vertical sectional view of the apparatus of the present invention and showing the discharge end of the feed horn assembly positioned in discharge relation relative to the chuck assembly.

The operation of the encasing machine 10 for encasing a product in a curved collagen casing 25 is best understood by a study of FIGS. 1, 6 and 7. As illustrated therein, the stuffing tube 150 is operable to selectively and reciprocally move along a predetermined substantially horizontal path of travel 183 between a first position 184 wherein it is disposed in predetermined, spaced relation relative to the chuck 90; and a second position 185, and which is illustrated most clearly by reference to FIG. 7, wherein the discharge end 152 of the stuffing tube 150 is disposed in the passageway 94 of the chuck 90 such that the meat batter exiting from the discharge end 152 is received in the individual collagen casings 25. The encasing machine 10 includes a drive means borne by the base 11 (not shown) and which is operable for selectively rotating the stuffing tube 150 and the chuck 90 in a coordinated fashion whereby the casing 25 upon being filled with the meat product is rotated to form the individual linked products and which further exits the chuck at the second or discharge end 100. The drive means is described in significant detail in U.S. Pat. No. 3,672,001. As earlier discussed the chuck 90 allows each of the encased products to move generally radially outwardly along an arcuate path of travel relative to the longitudinal axis 101 thereby maintaining the curved casing in an advantageous attitude whereby the casing can be substantially filled with the product to be encased. This relationship is clearly illustrated by reference to FIG. 7.

The drive means is connected to the air cylinder (not shown), and the air cylinder is releasably fixed to the connector mechanism 120 which in turn is releasably mounted on the first end 151 of the stuffing tube 150. In addition, the drive means acting through the driveshaft 72, is operable to impart selective rotational movement to the chuck 90 such that the product engaging ribs impart rotational movement to the collagen casings 25 in order to produce the linked products as illustrated in FIG. 7.

The apparatus of the subject invention achieves further laudable benefits by providing a stuffing tube 150 which includes a plurality of apertures 156 which are formed in the discharge end 152 thereof, the individual apertures causing the meat product pumped through the passageway 155 to move generally normally outwardly relative to the longitudinal axis 157 of the stuffing tube 150. This stuffing pattern created by the stuffing tube causes the product to be encased to fold against the wall of the collagen casing 25. As earlier discussed, this stuffing pattern has the overall effect of reducing friction against the casing wall thus inhibiting the production of smear and thereby encouraging the production of curved products having a commercially acceptable color following the smoking process.

Therefore, the apparatus of the present invention is particularly well suited for use on encasing machines which are currently in extensive use in the industry, and which further can be produced as standard equipment or which can be manufactured in the nature of a retrofit. In addition, the apparatus can be quickly assembled and disassembled for ease of maintenance. The invention is further adapted to reduce the costs related to manufacturing curved casing products by substantially eliminating the need for machines which are designed for essentially producing such curved casing products and which further can be constructed and installed at a relatively nominal price when compared with related prior art devices which are designed for essentially the same purposes.

Although the invention has been herein shown and described in what is conceived to be the most practical an preferred embodiments, it is recognized that departures may be made therefrom within the scope of the invention which is not to be limited to the illustrative details disclosed.

Having described my invention, what I claim is new and desire to secure by letters patent is:

1. An apparatus for encasing a product in a curved casing comprising:
   a base;
   a stuffing tube mounted on the base, and having a product receiving end and a discharge end, said discharge end having a plurality of apertures;
   a pump borne on the base and adapted to introduce the product to be encased into the product receiving end of the stuffing tube;
   a chuck rotatably mounted on the base and disposed in substantially coaxial alignment with the stuffing tube, said chuck having a wall defining a passageway, and wherein the wall has opposite first and second ends and wherein the wall located at the first end is substantially continuous and wherein the wall at the second end is discontinuous, and wherein the chuck is adapted to receive the curved casing to be filled; and
   drive means borne by the base and operable for selectively rotating said chuck, and wherein the casing upon being filled with the product exits the chuck at the second end thereof and moves generally radially outwardly relative to the chuck thereby maintaining the curved casing in an attitude whereby the curved casing can be substantially filled with the product.

2. An apparatus as claimed in claim 1 wherein the stuffing tube has an elongated main body which is movably mounted on the base for displacement along a predetermined path of travel from a first to a second position, and wherein the discharge end of the stuffing tube is positioned in spaced relation relative to the chuck when the stuffing tube is located in the first position, and further is received internally of the casing and positioned in the passageway and in spaced relation relative to the wall of the chuck when the stuffing tube is located in the second position, and wherein the discharge end of the tube includes two apertures and wherein the product exiting through the two apertures moves generally radially outwardly relative to the stuffing tube to fill the casing.

3. An apparatus as claimed in claim 2 wherein a plurality of ribs are mounted on the wall and which extend in radially inwardly disposed relation relative to the passageway and which are individually adapted to be positioned in force transmitting relation relative to the casing whereby rotational movement of the chuck causes rotational movement of the casing.

4. An apparatus as claimed in claim 3 wherein the individual vanes are disposed in a spaced predetermined generally helical pattern.

5. An apparatus as claimed in claim 1 wherein the wall of the second end is substantially semi-circular.

6. An apparatus as claimed in claim 1 wherein the second wall has first and second portions and wherein the first and second portions ar substantially arcuately shaped.

7. An apparatus for encasing a product in a curved casing comprising:
   a base;
   an elongated stuffing tube having a product receiving rearward end, a discharge end, and a longitudinal axis, the stuffing tube movably and rotatably mounted on the base for selective reciprocal and rotational movement about the longitudinal axis and for movement along a predetermined path of travel, the stuffing tube defining a passageway which extends from the rearward end to the discharge end, and wherein the discharge end includes a plurality of apertures which are individually positioned substantially normally relative to the longitudinal axis, and wherein the discharge end of the stuffing tube is adapted to be positioned within the curved casing;
   a pump for selectively introducing the product to be encased into the rearward end of the stuffing tube and forcing the product out the discharge end thereof and into the casing, the product exiting the stuffing tube through the apertures and moving in a direction generally normally relative to the longitudinal axis of the stuffing tube;
   a chuck rotatably mounted on the base and disposed in substantially coaxial alignment relative to the stuffing tube, the chuck having a wall with opposite first and second ends and defining a passageway extending longitudinally therethrough, and wherein the wall at the first end is substantially continuous and wherein the wall at the second end is discontinuous, and wherein a plurality of product engaging ribs are individually fixed in a predetermined pattern on the wall and which individually extend radially inwardly relative to the passageway, and wherein the discharge end of the stuffing tube is operable selectively to move into the passageway and be positioned in radially inwardly spaced relation relative to the wall of the chuck; and drive means borne by the base and operable for selectively rotating the stuffing tube and the chuck in a coordinated fashion, and wherein the casing upon being filled with the product exits the chuck at the second end thereof, and wherein the chuck permits the encased product to move generally radially outwardly relative to the longitudinal axis thereby maintaining the curved casing in an attitude whereby the curved casing can be substantially filled with the product.

8. An apparatus as claimed in claim 5 wherein a means for moving the stuffing tube along the path of travel is borne b the base, the moving means urging the stuffing tube along the path of travel from a first position wherein the discharge end is disposed in spaced relation relative to the chuck, to a second position wherein the discharge end is disposed in inwardly radially spaced relation relative to the wall of the chuck and in product discharging relation relative to a curved casing to be filled.

9. An apparatus as claimed in claim 8 wherein said stuffing tube includes two apertures which are disposed in registry one with the other.

10. An apparatus as claimed in claim 7 wherein the chuck has a predetermined length dimension and said discontinuous wall is substantially semi-circular shaped, and said continuous wall is substantially circular shaped.

11. An apparatus as claimed in claim 7 wherein the discontinuous wall has first and second portions which are substantially arcuately shaped.

12. An apparatus as claimed in claim 10 wherein the discontinuous wall has an outwardly facing surface and wherein a keyway is formed in the outwardly facing surface, and wherein an enlarged collar is disposed in circumscribing relation about the first end of the chuck.

13. An apparatus as claimed in claim 11 wherein the first portion has an outwardly facing surface and wherein a keyway is formed in the outwardly facing surface and wherein an enlarged collar is disposed in circumscribing relation about the first end of the chuck.

* * * * *

UNITED STATES PATENT AND TRADEMARK OFFICE
CERTIFICATE OF CORRECTION

PATENT NO. : 5,013,279
DATED : May 7, 1991
INVENTOR(S) : William E. Southworth

It is certified that error appears in the above—identified patent and that said Letters Patent is hereby corrected as shown below:

Column 4, Line 23, after "assembly" cancel "o" and insert --- or ---;

Column 10, Line 36, after "portions" cancel "ar" and insert --- are ---;

Column 11, Line 22, after "borne" cancel "b" and insert --- by ---.

Signed and Sealed this

Twenty-ninth Day of September, 1992

Attest:

DOUGLAS B. COMER

*Attesting Officer*　　　*Acting Commissioner of Patents and Trademarks*